United States Patent [19]

Fabian et al.

[11] 4,422,919

[45] Dec. 27, 1983

[54] ELECTROLYTIC CELL

[75] Inventors: Peter Fabian, Freigericht; Manfred Gündling, Alzenau; Peter Rössler, Ronneburg, all of Fed. Rep. of Germany

[73] Assignee: W. C. Heraeus GmbH, Hanau, Fed. Rep. of Germany

[21] Appl. No.: 421,391

[22] Filed: Sep. 22, 1982

[30] Foreign Application Priority Data

Sep. 26, 1981 [DE] Fed. Rep. of Germany ....... 3138438

[51] Int. Cl.³ .................... C25B 9/00; C25C 7/00
[52] U.S. Cl. .................................. 204/270; 204/278
[58] Field of Search .............. 204/149, 270, 278, 275

[56] References Cited

U.S. PATENT DOCUMENTS

| | | | |
|---|---|---|---|
| 3,282,823 | 11/1966 | Richards | 204/149 |
| 3,479,275 | 11/1969 | Gwynn | 204/149 |
| 3,824,172 | 7/1974 | Hodges | 204/270 |
| 3,835,020 | 9/1974 | Galnedner | 204/149 |
| 4,108,756 | 8/1978 | de Nora | 204/286 |
| 4,172,773 | 10/1979 | Pellegri et al. | 204/149 |

Primary Examiner—John F. Niebling
Attorney, Agent, or Firm—Frishauf, Holtz, Goodman and Woodward

[57] ABSTRACT

A compact electrolytic cell with direct through-flow comprises an electrode stack formed as a cartridge unit which is readily exchangeable into and out of a housing which is made of commercially available plastic tubing materials. The cell can be adapted to meet a wide range of application requirements by the variation of parameters such as salt concentration, flow rate, etc.

19 Claims, 6 Drawing Figures

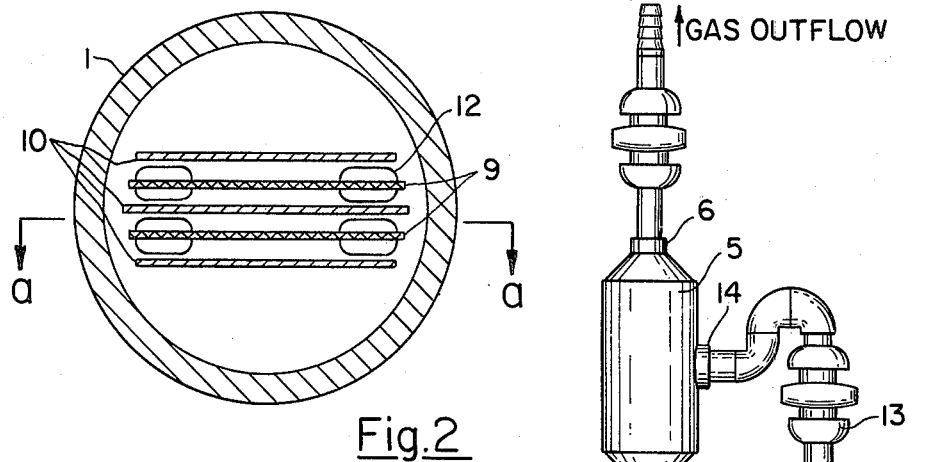
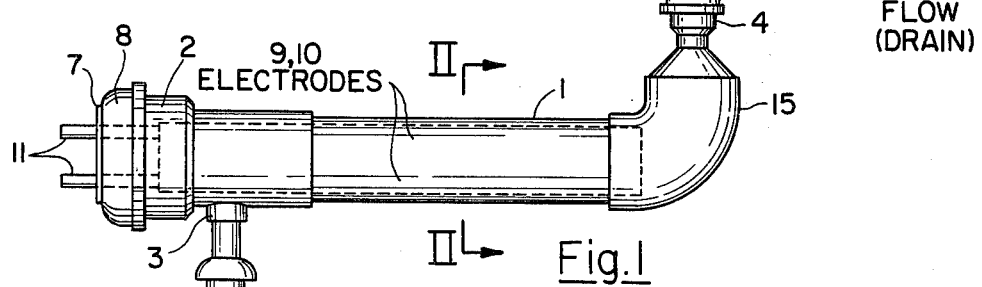
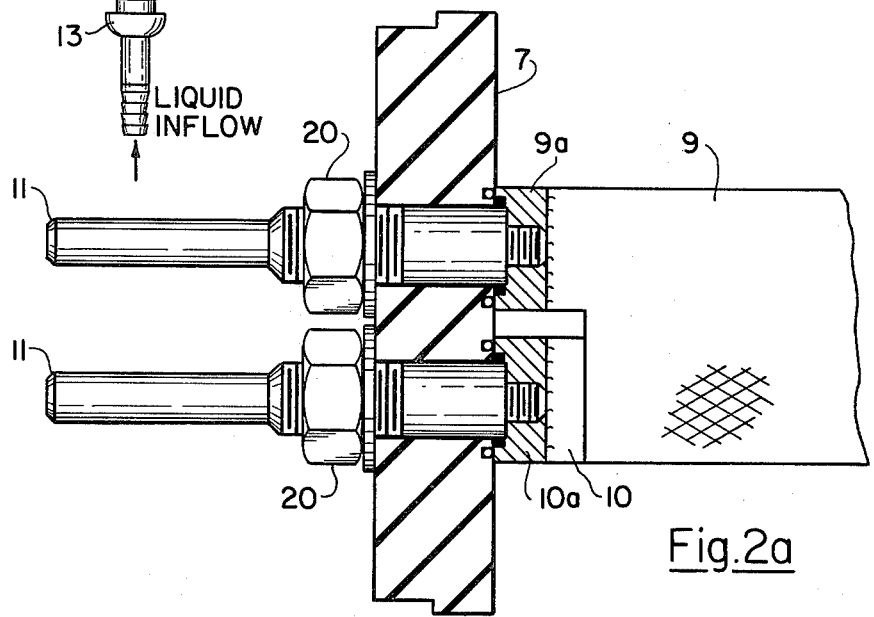

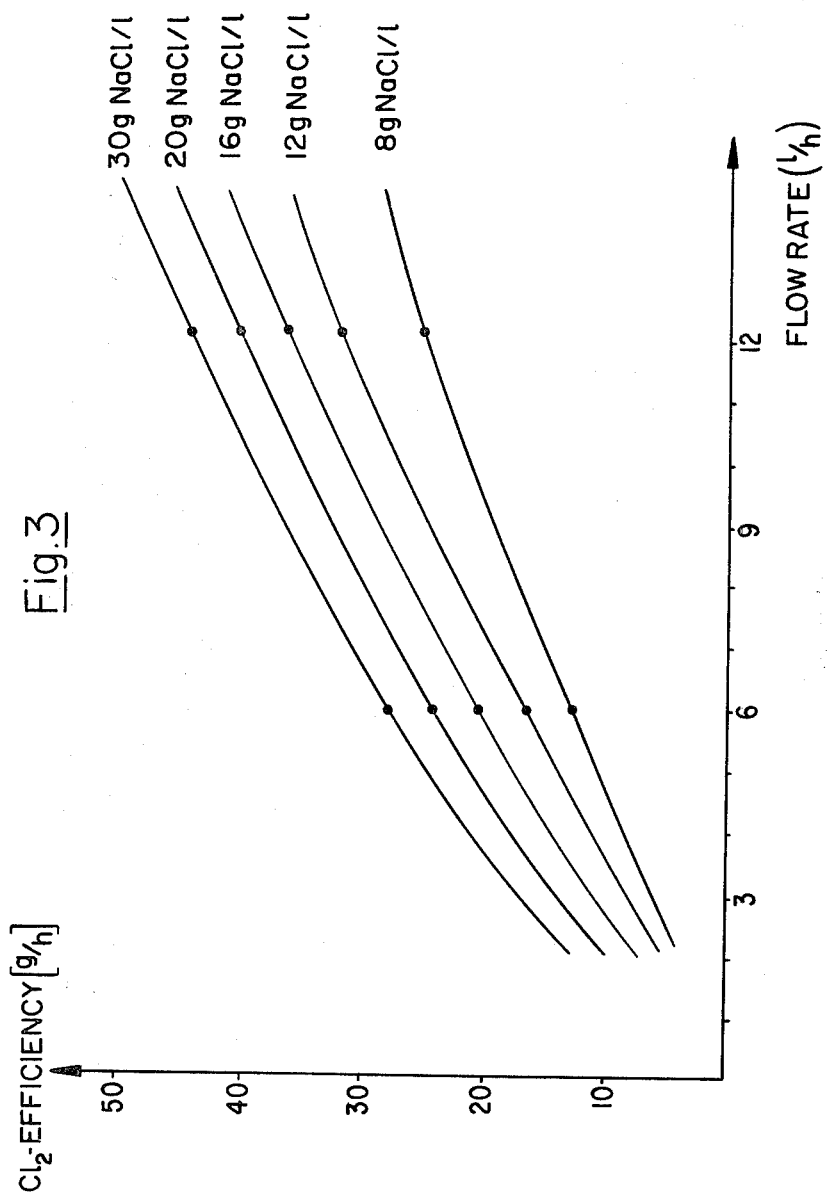

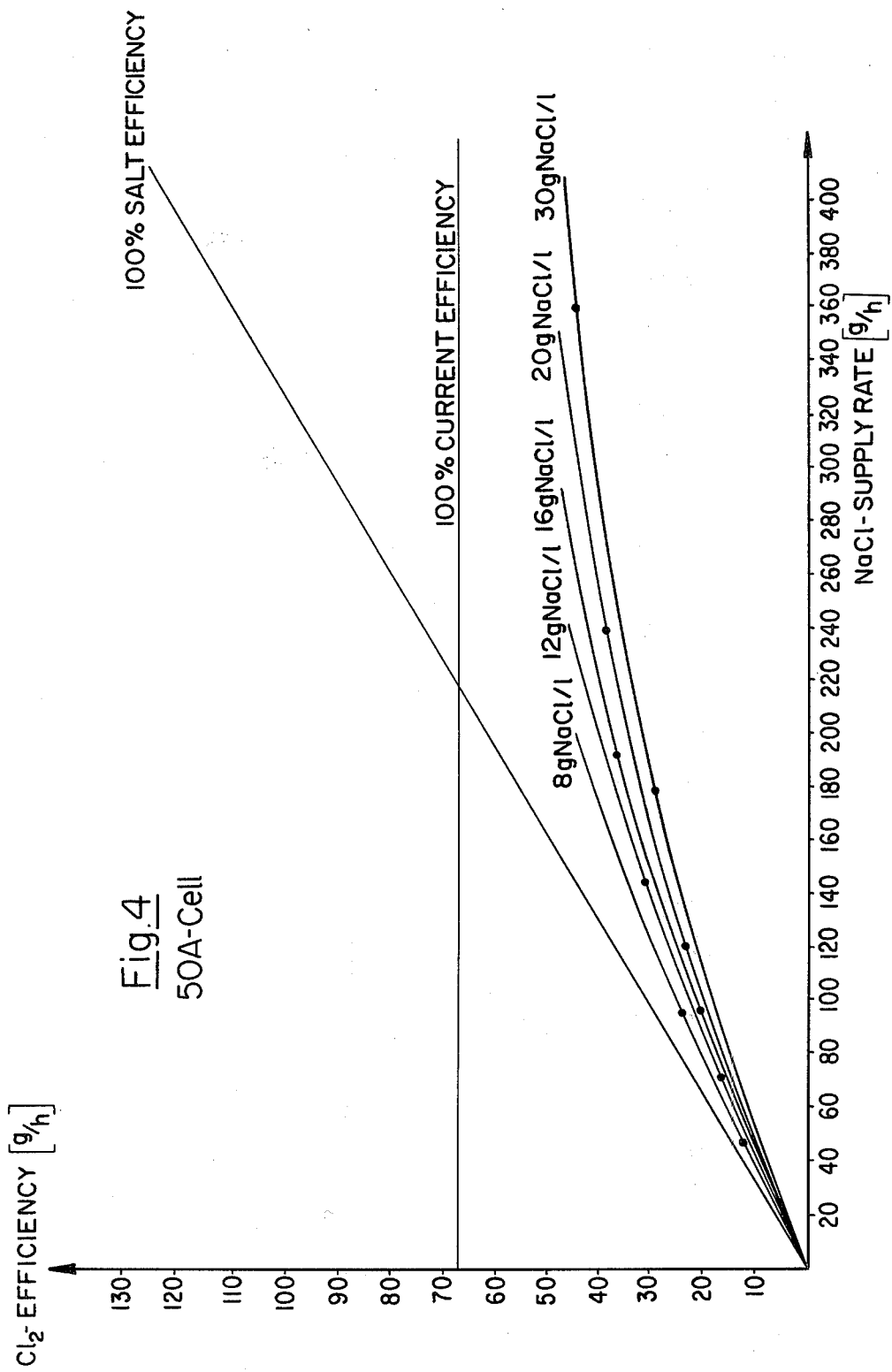

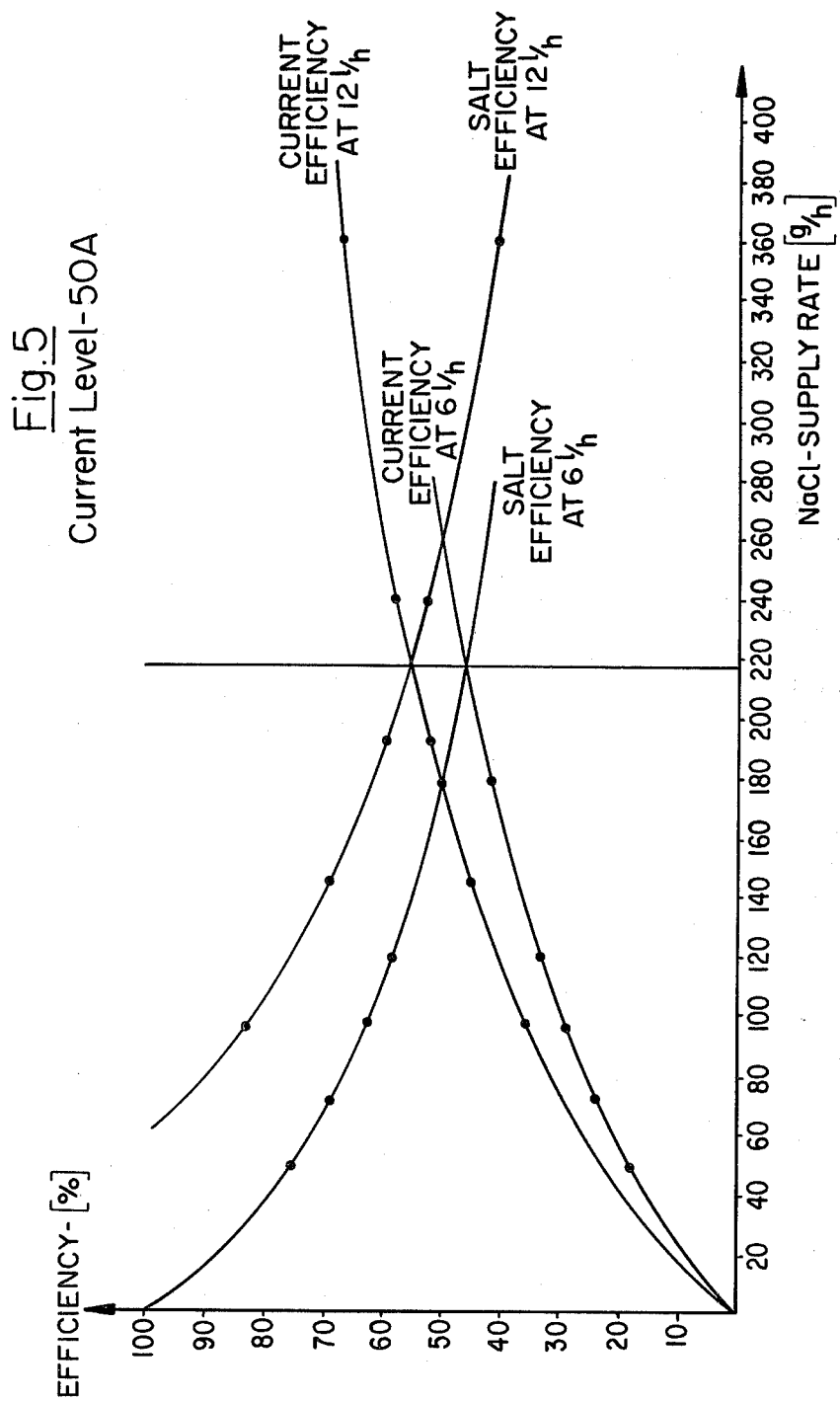

ELECTROLYTIC CELL

FIELD OF THE INVENTION

The present invention relates to an electrolytic cell for water treatment, and more particularly to a cell employing a hypochlorite solution for the sterilization of drinking water, drain water and cooling water. Such solutions are also used for sterilization in medical applications and in techniques for water cooling, to prevent growth of algae in the piping and cooler walls. Hypochlorite solution is unstable under the effect of light. In other words, it decomposes relatively quickly when exposed to light, so that only limited amounts of this solution should be prepared for immediate use.

BACKGROUND OF THE INVENTION

Known electrolytic cells of the type described herein, usually have their anode and cathode regions separated by a diaphragm or a membrane. A known cell, described in German Patent Disclosure document DE-OS 29 22 275, (U.S. Pat. No. 4,172,773) employs a porous permeable anode. The anodes and cathodes are reachable from the oppositely located sides of the housing of the cell, after loosening the appropriate cover as well as seals and ducts. According to page 11, paragraph 2 of DE-OS 29 22 275, the cell described there requires a high salt concentration, which is pressed through the porous anode. As shown in Table 11 thereof, a relatively high pressure is required to accomplish this, and therefore the cell is not suitable for every application.

SUMMARY OF THE INVENTION

It is an object of the present invention to create an electrolytic cell of simple, compact structure made of commercially available plastic piping materials, which can easily be disassembled for servicing or cleaning of the electrodes and which can be readily installed in existing piping systems. The cell exhibits high durability and good service life, and is readily adaptable to a wide range of application. An example of the application of the present invention is given in the following, in a schematic manner.

BRIEF DESCRIPTION OF THE DRAWINGS

FIG. 1 shows a piping system with an electrolytic cell installed;

FIG. 2 shows an enlarged cross sectional view along line II—II of FIG. 1;

FIG. 2a shows an enlarged cross section along the line a—a of FIG. 2;

FIG. 3 presents the results obtained in operation of the electrolytic cell as a set of parametric curves, showing the $Cl_2$-yield as a function of a quantity of flow (i.e., flow rate) at various levels of salt concentration and at a constant current of 50 amps;

FIG. 4 shows the results obtained in operation of the electrolytic cell as a set of parametric curves, showing the $Cl_2$-yield as a function of salt supply at various levels of salt concentration and at a constant current level of 50 amps, with a horizontal line drawn to indicate the $Cl_2$-yield at 100 percent current utilization and a linearly increasing straight line to indicate the $Cl_2$-yield at 100 percent salt-exploitation; and FIG. 5 presents the results obtained in use of the electrolytic cell showing two sets of curves of percentage exploitation as a function of salt supply at a constant current of 50 amps.

DETAILED DESCRIPTION

Referring to FIGS. 1, 2 and 2a, the electrolytic cell of the invention has a tubular shaped housing 1, which is closed off at one end by an end-cap 2. End-cap 2 is in the form of a threaded coupling sleeve, or it may be provided with a flange. At its other end, the tubular shaped housing 1 is provided with a means for coupling to the elbow 15, to which it is joined. A drain stub 4, followed by an outgassing container 5, are coupled to the elbow 15 at the other end of the elbow. An entrance stub 3 is connected to the pipe or tubular-shaped housing 1. Outgassing stub 6 of outgassing container 5 is located above container 5, and both of the stubs 4 and 6 are fastened, preferably co-axially, to container 5. It is advantageous to glue or weld together all of the above named parts 1 to 6, except for end-cap 2. These parts are made of chlorine-resistant synthetic materials, such as commercial polyvinyl chloride (PVC), post-chlorinated polyvinyl chloride or other chlorine resistant synthetic materials. Commercial PVC glues are suitable for the gluing, while welding of the synthetic components can be performed by the usual, hotair welding procedure.

As shown in FIG. 1, both ends of container 5 have reduced diameters, for example by tapering towards the respective connecting stubs. Approximately in the middle of container 5 and to its side, is a drain stub 14, which may be closed off by a valve 13. A similar valve 13 is also built into the entrance stub 3 of tubular housing 1.

Container 5 is dimensioned so that the speed of flow of the liquid in the container is slower than the rate of rise of the gas bubbles contained in the solution, so that a complete outgassing results.

Distributor plate 7, shown enlarged in FIG. 2a, is a disc which is made to fit into the end-cap 2 or into nut 8, and is made of the same synthetic material as the housing 1 of the electrolytic cell. An O-ring seal can of course be used in case the attachment is made to the threaded end cap 2.

The electrodes 9 and 10, anode and cathode respectively, shown in FIGS. 2 and 2a, are contained in housing 1 and are formed as an assembly or a stack of flat plates with a spacing between each electrode plate. The electrodes 9, 10 are also indicated in FIG. 1 by broken lines. Anodes 9 and cathodes 10 are welded, or otherwise electrically connected to headers or power distributing plates 9a, 10a, respectively, perpendicularly to the plane of the end-cap 2 and parallel to the plane of the current conducting pins 11. Headers 9a and 10a may be rectangular or semi-circular. The electrode plates 9 and 10 are arranged such that their smaller edged surfaces are attached to the distributor plate 7 (via headers 9a, 10a) in a comb-like manner. The current conducting pins 11 are set into two holes provided therefor in the distributor plate 7 and the flange of end-cap 2. Anodes 9 are located symmetrically in the small gaps or spacing between cathodes 10, as seen in FIG. 2. Between anodes 9 and cathodes 10 are spacers 12, FIG. 2, which are fastened to the anodes 9 and are made of synthetic plastic material. Spacers 12 maintain the electrodes 9 and 10 spaced from each other along the length thereof. Distributor plate 7 is tightened and sealed with threaded nuts 20 against the flange of end-cap 2.

The cathodes 10, the current conducting pins 11 and distributor plate 7 are preferably made of metals such as steel, nickel-coated steel, titanium, niobium, tantalum, or of alloys of these metals. They are made in the form of strips of sheet metal, perforated sheet metal, or mesh-material, with a thickness of about 0.5 to 5 mm, preferably 1 to 1.5 mm. This choice of materials is especially advantageous for the use of the electrolytic cell in the treatment of drain, waste or drinking water.

The anodes 9 are preferably made of a metal such as titanium, niobium or tantalum, or alloys of these metals. They are also formed into strips of sheet metal, perforated sheet metal, or mesh-material of these materials, with a thickness of about 0.5 to 5 mm, preferably 1 to 1.5 mm. The strip-shaped anodes 9 are provided with an electro-chemical active coating of materials such as platinum, platinum oxide or platinum metal mixed oxides or other metal oxides.

The gap between the strip-shaped cathodes 10 and anodes 9 is 0.5 to 3 mm, preferably 1 to 2 mm. In order to prevent short circuits which might arise from contact between cathodes 10 and anodes 9, the button-or strip-shaped spacers 12 made of polyvinyl chloride are provided.

An electrode stack (cartridge) made in this manner, forms a unit in which both cathodes and anodes may be readily removed from, and then reinserted into, the housing as a unit, for example for cleaning or reactivating of the electrodes, as described below. After removal from the housing, the cathodes and/or anodes may be replaced independently of each other.

In order to exchange the electrodes, the electrolytic cell 1 is shut off by valves 13 on the sides of housing 1 and container 5. After loosening of the end cap 2, with the flange or the threaded coupling sleeve 8, the electrode stack (cartridge together with the distributor plate 7 and current conducting pins 11 can be removed as a unit from the cell housing 1, without having to disassemble the entire housing or the entrance and drain pipes. The anodes 9, which are attached to the upper pin 11 in FIG. 2a via a header 9a, can be removed and/or can be replaced for example by opening the upper nut 20 in FIG. 2a to release the anodes 9. Similarly, cathodes 10 can be removed by removing lower pin 11 by means of lower nut 20 in FIG. 20.

Employing the above described arrangements and design for the electrode stack of a cartridge type, and of the tubular cell, results in good electrolytic mixing during the operation of the unit and yields good production results, as shown in the following.

Operating conditions:
Medium: $H_2O + NaCl$
Cell current load: 50 A
Cell voltage: from 4.12 V to 6.50 V
Brine temperature: from 17.5° C. to 24° C.
Cell temperature: from 34.5° C. to 49.5° C.

The graph of FIG. 3 illustrates by a family of curves the yield of $Cl_2$, in units of grams per hour (g/h), as a function of the flow rate in units of liters per hour (l/h). The curves are given at a constant current level of 50 amps and at variable salt or brine concentrations in units of gram per liter (g/l), with the concentration held constant along each curve.

The curves show that with increasing flow rate or quantity of flow, which corresponds at a constant salt concentration to an increase in the salt supply, the yield of $Cl_2$ increases. At a constant flow, the yield of $Cl_2$ increases as the salt concentration, and therefore also the salt supply, increases.

FIG. 4 shows the yield of $Cl_2$ as a function of salt supply at a constant current of 50 amps with variable salt concentrations. Also given in this graph is a horizontal line showing the $Cl_2$-yield at 100 percent current utilization or efficiency, and a line showing the linearly increasing $Cl_2$-yield for 100 percent salt exploitation (or 100% using up of salt).

The curves show that a given salt supply, the yield of $Cl_2$ increases with a decrease in salt concentration. A constant salt supply, combined with a decreased salt concentration actually corresponds to an increase in the flow quantity or flow rate. The curves also show that with increasing salt supply the percentage of current utilization, or efficiency, is improved while simultaneously the percentage of salt exploitation (or using up of salt) decreases.

The graphs of FIG. 5 show the percentage exploitation, or efficiency of utilization, of the current and the percentage exploitation of the salt, as a function of salt supply quantity. The curves are given at a constant current of 50 amps and at a constant flow rate. The curves show that as the salt supply quantity is increased, the efficiency of current utilization increases, while simultaneously the percentage exploitation of the salt decreases. At a current of 50 amps and a salt supply rate of 217.5 g/h, the percentage utilization of current equals the percentage exploitation of the salt. The values for current and salt exploitation increase, at a given, constant salt supply rate, as the flow rate is increased. Such a combination of increased flow rate with constant salt supply rate corresponds to a decrease in salt concentration.

The results presented in FIGS. 3 to 5 show that the electrolytic cell of the present invention can be adapted to meet the requirements of a wide range of applications, by changes of such parameters as salt concentration, flow rate, etc. Thus, a high percentage of salt exploitation, which is desired in treatment of bath water, can be obtained by lowering the salt concentration and increasing the flow rate. A high efficiency of current utilization can be obtained by increasing the salt concentration and lowering the flow rate.

The advantages of the invention include the following:

1. A compact structure is provided, permitting for example, the installation in a piping system which is made of commercially available synthetic materials. The installation of the cell into a piping system can be implemented either directly or as a shunt attachment.
2. The electrode stack can be made as a cartridge and fastened to an end cap which can be easily removed, and cathode or anode electrodes can be removed singly or as a unit without requiring the disassembly of numerous parts of the cell. This permits easy reactivation of single electrodes or of the complete electrode stack, for example for the purpose of cleaning the deposits off the electrodes, such as carbonate deposits.
3. The electrolytic cell of the present invention can be used with systems for cooling water, or for the treatment of waste-or drain water, which require a high efficiency of current utilization. The cell can also be used for the treatment of drinking-, bath- or brackish water, which depend upon a high percentage exploitation of the salt.
4. The electrolytic cell exhibits furthermore a high corrosion endurance for all of its parts, as well as safe outgassing of the electrolysis products, so as to avoid the danger of explosion resulting from the mixture of hydrogen with air.

Various changes and modifications may be made within the scope of the present invention.

We claim:
1. An electrolytic cell for use in the treatment of water in a flow-through piping system, comprising:
a horizontally extending tubular housing section (1) having an end opening at respective opposite ends thereof, and a liquid inflow means (3) communicating with the interior of said tubular housing section;
an end-cap (2) removably coupled to one end of said tubular housing section (1) for closing off the end opening at said one end of said tubular housing section (1), said end cap including a distributor plate (7);
an electrode stack, formed as a cartridge-like unit, mounted to said distributor plate (7) of said end-cap (2), said electrode stack comprising a plurality of anodes (9) and cathodes (10) alternately mounted substantially parallel and at a spacing from one another and adapted to be inserted in said tubular housing section (1); first and second power distributing parts (9a, 10a) respectively electrically coupled to said anodes and cathodes (9, 10), said power distributing parts (9a, 10a) being connected to said distributor plate (7), said cartridge-like electrode stack being tightly insertable into and fixed to said end opening at said one end of said tubular housing section (1) by means of said end cap being coupled to said one end of said tubular housing section (1); and
a connecting unit (15, 4, 5) coupled to the other end of said tubular housing section (1) and being external of said tubular housing section (1), said connecting unit comprising a liquid outflow means (14) and a gas outflow means (6) for exhausting gas from said tubular housing section (1);
said end cap (2) being structurally independent of said liquid inflow means (3) and said connecting unit (15, 4, 5) such that said end cap is removable with said electrode stack for servicing of said electrode stack without moving said liquid inflow means (3) and without moving said connecting unit (15, 4, 5) or said liquid outflow means (6).

2. The electrolytic cell of claim 1, wherein said connecting unit comprises an outgassing container (5) coupled to said other end of said tubular housing section, said liquid outflow means (14) being coupled to said outgassing container (5), and said gas outflow means (6) being coupled to said outgassing container (5) for exhausting gas from said tubular housing section via said outgassing container (5).

3. The electrolytic cell of claim 2, wherein said outgassing container comprises an enlarged portion and smaller cross-sectional portions at respective opposite ends thereof, one of said smaller cross-sectional portions being coupled to said tubular housing section (1), and the other of said smaller cross-sectional portions being coupled to said gas outflow means (6).

4. The electrolytic cell of claim 1, wherein said electrodes (9, 10) are arranged in a comb-like arrangement on said first and second power distributing parts (9a, 10a), and further comprising first and second electrically conducting pins (11) respectively coupled to said first and second power distributing parts (9a, 10a), said electrically conducting pins passing through said distributor plate (7) and said end-cap (2) for electrical connection to an electrical power supply, said electrically conducting pins comprising a portion of said removable electrode stack.

5. The electrolytic cell of claim 1 or 4, wherein said end-cap comprises a threaded part (8) which is removably and threadably coupled to said one end of said tubular housing section (1).

6. The electrolytic cell of claim 1 or 4, wherein said tubular housing section (1) and end-cap (2) are made of a chlorine-resistant plastic material.

7. The electrolytic cell of claim 6, wherein said chlorine-resistant plastic material is PVC (polyvinyl chloride).

8. The electrolytic cell of claim 1 or 4, wherein said electrode stack further comprises spacing means (12) between the individual electrodes of said electrode stack for spacing said individual electrodes from each other along the length thereof.

9. The electrolytic cell of claim 8, wherein said spacing means are synthetic plastic material parts.

10. The electrolytic cell of any one of claims 1, 2 or 3, wherein said liquid inflow means (3) comprises a conduit attached to said tubular housing section (1) perpendicular to the axis of said tubular housing section.

11. The electrolytic cell of claim 2 or 3, wherein said outgassing container (5) has walls which comprise synthetic plastic material at least at the inner surface thereof, and wherein said liquid outflow means (14) is provided on a side of said outgassing container (5) and said gas outflow means (6) is provided at an upper end of said outgassing container (5).

12. The electrolytic cell of claim 11, wherein said outgassing container (5) is dimensioned such that the liquid flow through said outgassing container (5) is slower than the flow of gas dissolved in the liquid flowing therethrough.

13. The electrolytic cell of claim 11, wherein said outgassing container (5) has generally cylindrical walls, and is arranged with the axis thereof substantially vertically, the lower section of said outgassing container having a decreasing diameter and being connected at a decreasing diameter portion to said other end of said tubular housing section (1), and the upper section of said outgassing container (5) having a decreasing diameter and being connected to said gas outflow means at a decreasing diameter portion of the upper end of said outgassing container (5).

14. The electrolytic cell of claim 2, wherein said tubular housing section (1), said liquid inflow means (3), said outgassing container (5), said liquid outflow means (14) and said gas outflow means (6) are comprised of readily available PVC parts which are adhered together.

15. The electrolytic cell of claim 4, wherein said electrically conducting pins (11) are removably connected to said distributor plate (7) and to said end-cap (2), and wherein said anodes (9) and cathodes (10) are respectively fixedly connected to said electrically conducting pins (11), said electrodes being removable from said electrode stack by disconnecting respective conducting pins (11) from said distributor plate (7) and said end-cap (2).

16. The electrolytic cell of claim 4, wherein said cathodes (10), said electrically conducting pins (11) and said distributor plate (7) are made of metals selected from the group of steel, nickel-coated steel, titanium, niobium, tantalum, or alloys of these metals.

17. The electrolytic cell of claim 4 or 16, wherein said anodes (9) are made of a metal selected from the group of titanium, niobium, tantalum or alloys of these metals.

18. The electrolytic cell of claim 17, wherein said anodes (9) have an electro-chemically active coating thereon, said coating being selected from the group of platinum oxide, platinum metal mixed oxides or other metal oxides.

19. The electrolytic cell of claim 1 or 4, wherein said anodes and cathodes are substantially flat, strip-shaped generally rectangular parts.

* * * * *